United States Patent [19]

Rengstl et al.

[11] Patent Number: 4,792,591

[45] Date of Patent: Dec. 20, 1988

[54] PROCESS FOR REDUCING THE HALOGEN CONTENT OF HALOGEN-CONTAINING POLYCARBOSILANES AND POLYSILANES

[75] Inventors: Alfred Rengstl, Reischach; Andrea Schmidhuber, Mehring, both of Fed. Rep. of Germany

[73] Assignee: Wacker-Chemie GmbH, Fed. Rep. of Germany

[21] Appl. No.: 51,927

[22] Filed: May 19, 1987

[30] Foreign Application Priority Data

Jun. 20, 1986 [DE] Fed. Rep. of Germany ....... 3620635

[51] Int. Cl.$^4$ ............................................ C08F 283/00
[52] U.S. Cl. .................................... 525/477; 556/430; 556/435; 528/28; 528/33; 528/35; 528/38
[58] Field of Search ................. 556/430, 435; 528/28, 528/35, 33, 38; 525/477

[56] References Cited

U.S. PATENT DOCUMENTS

| | | | |
|---|---|---|---|
| 4,340,619 | 7/1982 | Gaul, Jr. | 528/32 |
| 4,404,153 | 9/1983 | Gaul, Jr. | 556/435 |
| 4,482,689 | 11/1984 | Haluska | 528/38 |

*Primary Examiner*—Melvyn I. Marquis
*Attorney, Agent, or Firm*—Bierman & Muserlian

[57] ABSTRACT

A process for reducing the halogen content of polycarbosilanes and/or polysilanes containing halogen bonded directly to silicon atoms by reacting the polymers with hexamethyldisilazane.

9 Claims, No Drawings

PROCESS FOR REDUCING THE HALOGEN CONTENT OF HALOGEN-CONTAINING POLYCARBOSILANES AND POLYSILANES

STATE OF THE ART

Polysilanes and polycarbosilanes are valuable intermediates for the preparation of silicon carbide. Polysilanes, for example, can be prepared from organochlorosilanes and/or organochlorodisilanes in the presence of tetraalkylphosphonium or tetraalkylammonium halides as taught in U.S. Pat. No. 4,298,558 and British Patent No. 2,024,789. Because they are prepared in this manner, the said polymers contain substantial amounts of chlorine bonded to silicon atoms and to prevent the liberation of halogen-containing gases as a result of hydrolysis before the reaction to form silicon carbide, or by pyrolysis during this reaction, this halogen content must be reduced. Baney et al. [Organometallics (1983), (2), Pages 859 to 864] describe the reaction of halogen-containing polycarbosilanes and polysilanes with Grignard reagents, alcohols, lithium alanate and primary amines. Baney et al also describes the reaction of polyhalosilanes with hexamethyldisiloxane in the presence of a strong acid and toluene as the solvent in U.S. Pat. No. 4,310,481 of Dow Corning Corporation.

OBJECTS OF THE INVENTION

It was an object of the invention to provide a process for reducing the halogen content of halogen-containing polysilanes and polycarbosilanes by using simple apparatus and the reagent used being economical and capable of being handled without extensive safety precautions, without a solvent being required and undesired products and excess reagent can be removed in a simple manner after the reaction.

This and other objects and advantages of the invention will become obvious from the following detailed description.

THE INVENTION

The novel process of the invention for reducing the halogen content of at least one member of the group consisting of polysilanes and polycarbosilanes containing halogen bonded directly to silicon atoms comprises contacting polysilanes and/or polycarbosilanes with hexamethyldisilazane.

Polysilanes containing halogen bonded directly to silicon atoms are known, for example, from the literature cited above and they are comprised of units of the formula $$R_nSi \qquad \qquad I$$

in which R is identical or different halogens and/or hydrocarbon of 1 to 18 carbon atoms, particularly chlorine and/or methyl, and n is an integer of 0,1,2 or 3, and the units are bonded to one another via Si-Si bonds.

Polycarbosilanes containing halogen bonded directly to silicon atoms are also known and their preparation is described in, for example, Noll, Chemistry and Technology of Silicones, Academic Press, Orlando, 1968, pages 356 to 364. In the lower half of page 357, a carbosilane of the formula is cited:

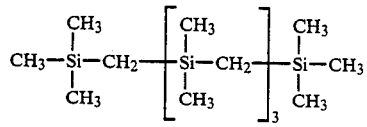

The terminal units of this molecule have the formula

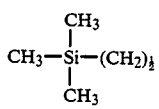

The methylene group (—CH$_2$—) is counted half for it is shared by two silicon atoms.

A look at the first formula on page 359 shows that the carbosilane units with two methyl groups have the formula

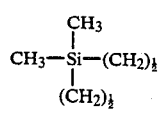

There are also groups present which have the formula

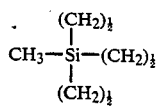

It is clear that the sum of the number of CH$_3$— groups (denoted as groups R in formula II of the application) and the number of —(CH$_2$)$_\frac{1}{2}$— groups ((R')$_\frac{1}{2}$ in formula (II) must amount to 4.

The purely mathematical expression for this is

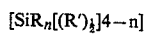

since the sum of n and 4−n equals 4.

This is equivalent to

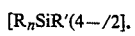

in which R and n have the above definitions and the R' are divalent hydrocarbon radicals of 1 to 18 carbon atoms, preferably phenylene and —(CH$_2$)$_{\overline{m}}$, in which m is an integer of 1 to 8. Such polycarbosilanes are obtainable, inter alia, by reacting dimethyldichlorosilane with 1,6-dichlorohexane and magnesium (ibid. page 357).

The process of the invention can of course be applied to all polymers which contain halogen bonded directly to silicon atoms. The term "polysilanes and/or polycarbosilanes" is also understood as meaning polymers which carry both units of formulae I and II in one molecule. This term also applies to mixtures of polysilanes, mixtures of polycarbosilanes and mixtures of at least one polysilane with at least one polycarbosilane.

The chemical reaction on which the process of the invention is based probably takes place in accordance with the following equation:

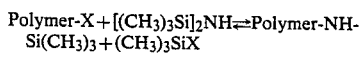

in which X is a halogen atom, preferably chlorine, bonded directly to a silicon atom. Thus, a by-product formed in the reaction of polysilanes and/or polycarbosilanes containing Si-bonded chlorine with hexamethyldisilazane is trimethylchlorosilane, which is preferably distilled off during the reaction.

In the process of the invention, the stated polysilane and/or polycarbosilanes are preferably brought into contact with hexamethyldisilazane at temperatures from 20° C. to 300° C., in particular from 100° C. to 200° C. The reaction can be carried out under atmospheric pressure, i.e. 0.102 mPa (absolute) or about 0.102 mPa (absolute), but may also be carried out under higher or lower pressures. Pressures of 0.01 mPa to 2 mPa (absolute) are preferred.

The pressure and temperature during the reaction time, i.e. the time for which the stated polysilanes and/or polycarbosilanes are to be brought into contact with hexamethyldisilazane, should preferably be chosen so that the trimethylhalosilane formed can be distilled off. The reaction time is preferably from 0.1 hour to 10 hours, particularly from 1 hour to 5 hours. During the reaction, or thereafter, any excess hexamethyldisilazane present is preferably distilled off.

The process of the invention can be carried out with the addition of an inert solvent. Examples of such solvents are aromatics and substituted aromatics such as benzene, toluene, xylenes and mesitylene; aliphatic hydrocarbons and mixtures thereof such as n-octane, n-decane, a mixture of octane isomers, petroleum ethers of various boiling ranges, and the like.

In the process of the invention, hexamethyldisilazane used as a reagent preferably also assumes the role of the solvent or suspending medium so that no additional solvent is required. Accordingly, it may be advisable to use hexamethyldisilazane in excess of the molar equivalent to the chlorine to be removed.

In the following examples there are described several preferred embodiments to illustrate the invention. However, it should be understood that the invention is not intended to be limited to the specific embodiments.

The examples below were carried out under a pressure of 0.10 mPa (absolute), unless stated otherwise. The temperature was 20° C., unless stated otherwise. Percentages are based on the weight of the particular polysilane or polycarbosilane.

EXAMPLE 1

A solution of 20 g of a polysilane containing 35% Si-bonded chlorine and whose organic groups were methyl groups in 38.5 g (0.24 mol) of hexamethyldisilazane was heated to 200° C. over 120 minutes in a distillation apparatus, and the volatile components were distilled off at this temperature. Then, the reaction mixture was left for 5 minutes at 200° C. at under 1 kPa (absolute) and finally cooled to obtain 19.6 g of a polycarbosilane resin having a nitrogen content of 5.3% and a chlorine content of 0.7%.

EXAMPLE 2

A solution of 50 g of the polysilane used in Example 1 in 80.5 g (0.5 mol) of hexamethyldisilazane was heated from 20° C. to 150° C. over 100 minutes in a distillation apparatus, and the volatile components were distilled off. The distillate contained 62.8% of hexamethyldisilazane and 37.2% of chlorotrimethylsilane. Then, the reaction mixture was left at 150° C. at under 1 kPa (absolute) and finally cooled to obtain 28.2 g of a polymer which was soluble in toluene, in dichloromethane and in trichloromethane and had a nitrogen content of 5.1% and a chlorine content of 13.1%.

EXAMPLE 3

A solution of 30 g of the polysilane used in Example 1 in 240.24 g (1.5 mol) of hexamethyldisilazane was heated from about 20° C. to 160° C. over 110 minutes in a distillation apparatus, and the volatile components were distilled off at this temperature. Then, the reaction mixture was left for 5 minutes at 160° C. at 1 kPa (absolute) and finally cooled to obtain 52.5 g of a colorless porous solid having a nitrogen content of 7.3% and a chlorine content of 3.7%.

EXAMPLE 4

A solution of 10 g of the polysilane used in Example 1 in 50 ml of mesitylene and 16.47 g (0.1 mol) of hexamethyldisilazane was refluxed for 3 hours and then the volatile components were distilled off at 100° C. at under 1 kPa (absolute). The remaining residue was left to cool to obtain 13 g of a porous solid having a nitrogen content of 5.4% and a chlorine content of 2.9%.

EXAMPLE 5

Example 4 was repeated, except that the reaction mixture, instead of being refluxed for 3 hours, was heated for 10 hours at 250° C. in an autoclave. After the volatile components had been distilled off under 1 kPa (absolute) and at up to 100° C., 13.5 g of a fusable polymer which was soluble in tetrahydrofuran, CCl$_4$, CHCl$_3$ and toluene and had a nitrogen content of 5.0% and a chlorine content of 4.6% were obtained.

EXAMPLE 6

A solution of 1 g of a polymer of the formula (SiCl$_2$)$_x$ in 5 ml (3.85 g) of hexamethyldisilazane was heated from about 20° C. to 150° C. over 110 minutes and after the volatile components had been distilled off under 1 kPa (absolute) and at up to 100° C., 1.7 g of an infusable solid which was soluble in CCl$_4$ and toluene and had a nitrogen content of 11% and a chlorine content of 2.5% were obtained.

EXAMPLE 7

A polycarbosilane containing 50.1% of Si-bonded chlorine was prepared by reacting equimolar amounts of dichlorodivinylsilane and dichlorosilane in toluene in the presence of a platinum catalyst. A solution of 12.6 g (0.05 mol) of this polycarbosilane in 48.3 g (0.3 mol) of hexamethyldisilazane was heated to 200° C. over 80 minutes and the volatile components were distilled off to obtain 15.2 g of an infusible solid which was insoluble in tetrahydrofuran, toluene, CCl$_4$ and CHCl$_3$ and had a chlorine content of 12.9% and a nitrogen content of 4.6%.

EXAMPLE 8

A solution of 10 g (0.1 mol) of dichlorosilane in 200 ml of toluene was reacted with 3 g of acetylene in the presence of a platinum catalyst at 0° C. The mixture was then heated at 80° C. for 1 hour. After the solvent had been distilled off, 11.8 g of a brown oil having a chlorine content of 55% were obtained. 48.3 g (0.3 mol) of hexamethyldisilazane were added to this amount of oil, and the mixture was heated to 195° C. over 120 minutes. The volatile components were distilled off to obtain 14.5 g of an infusible polymer which was insoluble in tetrahydrofuran, CCl₄, CHCl₃ and toluene and had a chlorine content of 17.4% and a nitrogen content of 8.4%.

Various modifications of the process of the invention may be made without departing from the spirit or scope thereof and it is to be understood that the invention is intended to be limited only as defined in the appended claims.

What we claim is:

1. A process for reducing the halogen content of polysilanes and/or polycarbosilanes containing halogen bonded directly to silicon atoms comprising reacting in solution or suspension polysilanes and/or polycarbosilanes with hexamethyldisilazane.

2. The process of claim 1 wherein the contact is effected at temperatures from 20° C. to 300° C.

3. The process of claim 1 wherein a trimethylhalosilane formed by the reaction of hexamethyldisilazane with halogen bonded directly to silicon atoms of the polysilanes and/or polycarbosilanes is distilled off during the reaction.

4. The process of claim 2 wherein a trimethylhalosilane formed by the reaction of hexamethyldisilazane with halogen bonded directly to silicon atoms of the polysilanes and/or polycarbosilanes is distilled off during the reaction.

5. The process of claim 1 wherein the reaction is effected at atmospheric pressure.

6. The process of claim 1 wherein the contacting is for 6 minutes to 10 hours.

7. The process of claim 1 wherein the contacting is 1 to 5 hours.

8. The process of claim 1 wherein an excess of hexamethyldisilazane is used as a solvent.

9. A process for reducing the halogen content of polysilanes of the formula RnSi and/or polycarbosilanes of the formula $$[R_nSi-R'_{(-n)/2}]$$

in which R is identical or different halogen or are divalent hydrocarbon radicals of 1 to 18 carbon atoms, R' are divalent hydrocarbon of 1 to 18 carbon atoms, and n is 0, 1, 2 or 3 containing halogen bonded directly to silicon atoms comprising contacting the said polysilanes and/or polycarbosilanes with hexamethyldisilazane.

* * * * *

UNITED STATES PATENT AND TRADEMARK OFFICE
CERTIFICATE OF CORRECTION

PATENT NO. : 4,792,591
DATED : Dec. 20, 1988
INVENTOR(S) : ALFRED RENGSTL and ANDRE SCHMIDHUBER It is certified that error appears in the above-identified patent and that said Letters Patent is hereby corrected as shown below:

| Col. | Line | | |
|---|---|---|---|
| 2 | 66 & 67 | " NH⇌Polymer" should be | --NH⇌Polymer-- |
| 6 | Claim 9 | Formula "$[R_n Si\ R'(-n)/2]$" should be $--[R_n Si-R'_2 -n]--$ | |

Signed and Sealed this

Ninth Day of May, 1989

Attest:

DONALD J. QUIGG

Attesting Officer      Commissioner of Patents and Trademarks

UNITED STATES PATENT AND TRADEMARK OFFICE
CERTIFICATE OF CORRECTION

PATENT NO. : 4,792,591
DATED : Dec. 20, 1988
INVENTOR(S) : ALFRED RENGSTL and ANDRE SCHMIDHUBER It is certified that error appears in the above-identified patent and that said Letters Patent is hereby corrected as shown below:

| Col. | Line | | |
|---|---|---|---|
| 2 | 46 | "$[R_n SiR'(4-/2]$" should be | --$[R_n SiR'_{(4-n)/2}]$-- |
| 6 | Claim 9 Line 4 | "$[R_n Si-R'(-n)/2]$" should be | --$[R_n SiR'_{(4-n)/2}]$-- |
| 2 | 66 & 67 | "NH⇌Polymer" should be | --NH⇌Polymer-- |

This certificate supersedes certificate of correction issued May 9, 1989.

Signed and Sealed this

Thirteenth Day of June, 1989

Attest:

DONALD J. QUIGG

Attesting Officer

Commissioner of Patents and Trademarks